United States Patent
Boehm et al.

(10) Patent No.: US 9,796,610 B2
(45) Date of Patent: Oct. 24, 2017

(54) PROCESS FOR SEPARATING OFF CARBON BLACK FROM A WASTEWATER STREAM

(75) Inventors: Achim Boehm, Frankenthal (DE); Petra Schmitz-Baeder, Frankenthal (DE)

(73) Assignee: BASF SE, Ludwigshafen (DE)

( * ) Notice: Subject to any disclaimer, the term of this patent is extended or adjusted under 35 U.S.C. 154(b) by 774 days.

(21) Appl. No.: 12/440,794

(22) PCT Filed: Sep. 12, 2007

(86) PCT No.: PCT/EP2007/059555
§ 371 (c)(1),
(2), (4) Date: Mar. 11, 2009

(87) PCT Pub. No.: WO2008/037588
PCT Pub. Date: Apr. 3, 2008

(65) Prior Publication Data
US 2010/0038319 A1    Feb. 18, 2010

(30) Foreign Application Priority Data
Sep. 28, 2006 (EP) .................................. 06121415

(51) Int. Cl.
*C02F 1/54* (2006.01)
*C02F 9/00* (2006.01)
*C02F 101/30* (2006.01)

(52) U.S. Cl.
CPC .................. *C02F 1/54* (2013.01); *C02F 9/00* (2013.01); *C02F 2101/30* (2013.01); *C02F 2303/12* (2013.01); *C02F 2305/04* (2013.01); *C02F 2305/12* (2013.01)

(58) Field of Classification Search
CPC ........................................................ C02F 1/54
See application file for complete search history.

(56) References Cited

U.S. PATENT DOCUMENTS

| 4,105,558 | A | * | 8/1978 | Heinrich | B01D 21/01 210/199 |
|---|---|---|---|---|---|
| 4,411,797 | A | * | 10/1983 | Sander et al. | 210/727 |
| 4,609,469 | A | * | 9/1986 | Keoteklian | B01D 61/025 210/609 |
| 4,728,437 | A | | 3/1988 | Gettert et al. | |
| 4,828,715 | A | | 5/1989 | Sander et al. | |
| 5,073,271 | A | | 12/1991 | Sander et al. | |
| 5,628,911 | A | * | 5/1997 | Kowallik et al. | 210/710 |
| 5,824,834 | A | * | 10/1998 | Bachtler et al. | 585/540 |
| 2006/0283806 | A1 | * | 12/2006 | Kojima et al. | 210/725 |

FOREIGN PATENT DOCUMENTS

| DE | 234 851 | | 4/1986 | |
|---|---|---|---|---|
| EP | 0 096 244 | | 12/1983 | |
| EP | 0 213 402 | | 3/1987 | |
| EP | 0 286 872 | | 10/1988 | |
| EP | 0 441 209 | | 8/1991 | |
| EP | 1035077 | A1 * | 3/2000 | ............. C02F 11/14 |
| EP | 1493716 | A1 * | 1/2005 | |

OTHER PUBLICATIONS

Kim et al. "Size Determination of Diesel Soot Particles Using Flow and Sedimentation Field-Flow Fractionation". 1999. Anal. Chem. vol. 71. pp. 3265-3272.*
von Phul, S.A. "Antifoam What is it? How does it work? Why do they say to limit its use?". Jan. 2006. <http://www.d-foam.com/files/>.*
DeSilva, Frank. "Activated Carbon Filtration". 2000. Water Quality Products Magazine.*

* cited by examiner

*Primary Examiner* — Peter Keyworth
(74) *Attorney, Agent, or Firm* — Oblon, McClelland, Maier & Neustadt, L.L.P.

(57) ABSTRACT

A process for cleaning a wastewater stream which comprises soot and is obtained in the preparation of acetylene, the soot being present in finely divided form in the wastewater, wherein the soot is removed by subjecting the wastewater to a solid concentration by sedimentation and then the soot sludge obtained in the sedimentation is dewatered further by a pressure filtration.

30 Claims, No Drawings

PROCESS FOR SEPARATING OFF CARBON BLACK FROM A WASTEWATER STREAM

CROSS-REFERENCE TO RELATED APPLICATIONS

This application is a National Stage of PCT/EP2007/059555 filed on Sep. 12, 2007. This application is based upon and claims the benefit of priority to European Application No. 06121415.1 filed on Sep. 28, 2006.

BACKGROUND OF THE INVENTION

The present invention relates to an improved process for removing soot from a wastewater stream which is obtained in the preparation of acetylene, the soot being present for the most part in finely divided form.

Acetylene is prepared industrially, inter alia, by the process which has been developed by BASF and is based on partial oxidation of hydrocarbons (preferably natural gas) with oxygen. It is described, for example, in U.S. Pat. No. 5,824,834 and in "Ullmann's Encyclopedia of Industrial Chemistry, Sixth Edition, 2000, Electronic Release, Chapter 4.2.1".

The two feedstocks, hydrocarbon and oxygen, are first preheated, to from approx. 500 to 650° C. in the case of use of natural gas, then they are mixed and only then are they converted in the firing chamber in a flame which is stabilized by the so-called burner block. Preheating and premixing are required for high acetylene yields.

The flame reaction at temperatures above about 1500° C. is quenched by spraying water in after a few milliseconds, i.e. the very rapid cooling to approx. 90° C. terminates the free-radical chain reaction in the flame. This prevents the degradation of the thermodynamically unstable acetylene intermediate. The reaction product is the so-called cleavage gas, which is a mixture of acetylene, crude synthesis gas (mainly $H_2$ and CO), steam and by-products. One of the by-products in this case is soot. Upstream of the compression, the cleavage gas is cooled typically to approx. 30-50° C. in order to condense the majority of the steam and hence to reduce the amount of gas to be compressed.

The soot formed as a by-product is found to be troublesome in the subsequent process stages and, to enhance the effectiveness of the process, efforts are therefore made to remove it from the cleavage gas.

The removal is effected predominantly by scrubbing the soot-containing gas with water, which, according to the process, gives rise to wastewater—often also referred to as "soot water"—with soot content from about 0.1 to 3% by weight. What is found to be particularly problematic in this context is that the soot is present for the most part in finely divided form; the size of the soot particles is typically in a range from a few nanometers to millimeters. The primary particles formed in the high-temperature zone of the acetylene synthesis have a diameter of from 20 to 300 nm. According to the process conditions in the acetylene synthesis, these primary particles may agglomerate to give particles up to 1 mm in size, generally particles from 0.001 to 0.05 mm in size.

The soot particles may be suspended in the soot water or else float on the surface unwetted by the water. Further constituents of the wastewater to be cleaned may be hydrocarbons and inorganic salts such as sodium salts. Sodium hydroxide solution is generally added in order to neutralize organic acids which form in the process and in order thus to prevent corrosion. As a result, the pH is usually in the range from 7 to 10.5.

Owing to the small particle size and the fine distribution of the soot, the direct removal of the soot particles from the wastewater of the acetylene preparation by means of filtration apparatus is found to be complicated and unsatisfactory with regard to its effectiveness in the known processes. DE-A 3528598 discloses a process for cleaning a soot-containing wastewater stream which stems from a high-temperature process. In this case, an additive such as calcium carbonate or lime hydrate is added to the wastewater in considerable amounts (from 2 to 10 kg/m$^3$), then a flocculant is supplied and, immediately thereafter, the wastewater thus pretreated is subjected to a filtration, a gravity filtration being followed by a pressure filtration (claim 1). With regard to the cleaning of a soot-comprising wastewater stream from the acetylene preparation, this process is, however, found to be disadvantageous. For instance, the two-stage filtration requires complicated apparatus such as a belt filter which, as well as high procurement costs, also entails increased cost and inconvenience with regard to maintenance and energy demands. The concept of the directly linked two-stage filtration also leads to the disadvantage that, in the case of varying occurrence of wastewater to be cleaned or in the event of bottlenecks in one process stage, it is not possible here to react flexibly; the possibility of buffering and decoupling these process steps would be desirable. An additional complicating factor is that the filtercake obtained from the gravity filtration, owing to the elevated solids content, can already be handled only with difficulty, the effectiveness of the process being restricted further by the fact that the concentration of soot in this filtercake is reduced by the additionally supplied solid additives such as calcium carbonate. It is also disadvantageous that the amount of filtercake to be disposed of is increased by the additionally supplied additives such as calcium carbonate. This leads to a higher level of apparatus complexity in order to store the additives (reservoir vessel) and to meter them (control of the metering rates).

It is thus an object of the invention to provide an improved process for cleaning a wastewater stream which comprises soot and is obtained in the preparation of acetylene, the soot being present in finely divided form in the wastewater, which avoids the disadvantages mentioned and which enables removal of the soot in an effective manner which is simple from a process technology point of view with a high level of operational reliability, while enabling flexible reaction to varying operating conditions. At the same time, a solid residue which can be disposed of either by incineration or landfill disposal should be obtained.

Accordingly, a process has been found for cleaning a wastewater stream which comprises soot and is obtained in the preparation of acetylene, the soot being present in finely divided form in the wastewater, which comprises removing the soot by subjecting the wastewater to a solid concentration by sedimentation and then further dewatering the soot sludge obtained in the sedimentation by a pressure filtration.

The inventive concentration of the soot water is effected by means of gravity in conventional sedimentation vessels, for example thickeners or lamella clarifiers. The thickening achieves soot sludges with solid concentrations in the range from 1 to 4% by weight, preferably from 2 to 3% by weight. The soot sludge obtained by the sedimentation can advantageously be conveyed with a displacer pump, preferably an eccentric screw pump. The advantage of this inventive embodiment is that the sedimentation device and the pressure filtration can be set up in a spatially separate manner. Moreover, the sedimentation vessel can simultaneously serve as a soot sludge buffer in the case of appropriate dimensioning. The necessary clarifying area of the sedimentation vessel is dependent on the soot concentration present in the wastewater and on the volume flow. The charge based on the clarifying area is typically in the range from 0.5 to 5 $m^3/m^{2}*h$, preferably from 0.5 to 3 $m^3/m^{2}*h$. Hydraulic residence times of from 1 to 2 hours should be observed. The sedimentation vessel consists generally of a cylindrical part and a lower conical part which promotes the soot sludge discharge. The angle of the cone is preferably in the range from 70° to 100°, preferably 90°.

The ratio of diameter to height is in the range from 1:1 to 1:3, preferably from 1:1 to 1:1.5.

As a result, it is possible to react flexibly to varying solid loads, to use batchwise pressure filtration and to perform maintenance work in the subsequent process stages with simultaneously continuing occurrence of soot water, as a result of which the effectiveness of the process according to the invention is significantly enhanced.

The soot sludge obtained in the sedimentation is subsequently subjected to a pressure filtration in a dewatering apparatus. Preference is given to transporting the soot sludge from the sedimentation stage to the pressure filtration stage by means of a displacer pump. Dewatering apparatus recommended for the performance of the pressure filtration is batchwise apparatus such as chamber filter presses, membrane filter presses or continuous screening belt presses.

To improve the dewatering, it is additionally possible to mix a flocculant (F) into the soot sludge. The preferred amounts of flocculant are in the range from 0.5 to 5 g/kg of solid. The metered addition of the flocculant is effected preferably in the form of a solution; this can be done, for example, upstream of the charging pump and upstream of the dewatering apparatus, or preferably downstream of the charging pump and immediately upstream of the dewatering apparatus. For this purpose, a mixing device as described, for example, in EP 0710625 B1 is recommended in order to obtain a readily dewaterable, flocculated suspension.

The organic flocculants used may be commercial brands. These are water-soluble compounds based on acrylamide or acrylic acid. In the process according to the invention, anionic flocculants are found to be particularly suitable. The required amounts of flocculent are in the range from 1 to 10 g of active substance/kg of soot. The flocculants are used preferably as aqueous solutions having concentrations of from 0.05 to 0.2%. The metered addition of the flocculant solution upstream of the inventive sedimentation can be effected directly into the soot water line. Very good mixing can be effected either by means of a static mixer or a separate stirrer vessel.

Useful charging pumps have been found to be particularly eccentric screw pumps (piston membrane pump, compressed air membrane pump). Pumps, for example centrifugal pumps in which high shear forces occur in the liquid, are unsuitable. The degree of deposition on chamber filter presses is at least 95% of the soot to be removed. In the case of screening belt presses, 90% can be achieved. Filtrate contaminated with soot particles can be recycled into the sedimentation stage for further clarification.

The filtercakes obtained are solid and brittle and have solids contents of from 20 to 30% by weight, preferably 23-25% by weight. The consistency of the filtercakes satisfies the requirements of landfill deposition. The disposal of the filtercakes obtained in an appropriate incineration plant is often the more economically viable solution as a result of their energy content (calorific value).

A further object of the invention consists in fully dispersing floating soot in the wastewater by means of a pretreatment.

Moreover, it should be possible to substantially remove hydrocarbons dissolved in the process from the soot water.

Soot fractions which, owing to their chemical or physical properties, float on the water surface are preferably suspended by the use of a suitable surfactant upstream of the sedimentation in order to achieve substantially complete deposition of the soot solids in the sedimentation vessel. These are water-soluble macromolecular compounds which are prepared by alkoxylation of predominantly linear fatty alcohols and which, as surface-active substances, improve the wettability of the soot particles. In the process according to the invention, nonionic products which have good wetting properties with respect to hydrophobic substances are found to be particularly suitable. In order not to impair the operation of the subsequent process stages, the surfactant should have a very low foaming tendency. The advisable amounts of surfactant are in the range from 1 to 10 g/kg of soot. The metered addition of the surfactant upstream of the sedimentation can be effected directly into the soot water line. Very good mixing is effected either by means of a pump, a static mixer or a separate stirrer vessel. Should the foam formed by the addition of surfactants disrupt the operation of the process according to the invention (in the sedimentation or the pump), the foam formation can be reduced effectively with the aid of defoamers known to those skilled in the art.

Adsorbable organic hydrocarbons present in the wastewater stream may, if required, advantageously be reduced upstream of the sedimentation by addition of activated carbon (AC). The dissolved organic compounds are adsorbed on the activated carbon. The activated carbon is eliminated from the wastewater together with the soot in the pressure filtration stage. A favorable activated carbon dosage has been found to be an amount of from 5 to 15 g of AC/g of DOC (dissolved organic carbon). The exact requirement for activated carbon in the particular case can be determined by the person skilled in the art by recording an adsorption isotherm. The activated carbon is preferably added to the soot water as an aqueous suspension in a concentration of from about 10 to 20% by weight in a stirred vessel.

In order to improve the filtration properties of the soot sludge in the pressure filtration (increase in the filter area loading; achievability of a minimum dry substance content in the filtercake), a filtration assistant can be added to the soot water. Suitable substances for this purpose are especially inorganic substances, for example ash from an incineration plant. The necessary conditioning amounts are in the range from 0.1 to 1 kg of assistant/kg of soot. This filtration assistant can be added upstream of the sedimentation or upstream of the pressure filtration.

The process according to the invention offers an effective type, which is simple from a process technology point of view, of cleaning a soot-laden wastewater stream which stems from acetylene preparation. With a low level of apparatus complexity, removal of the soot is enabled here, while additionally allowing flexible reaction to varying operating conditions, which further enhances the effectiveness of the process according to the invention.

EXAMPLES

In the example which follows, soot-contaminated wastewater having a solids concentration of from 1 to 2 g/l of ultrafinely divided solid from an acetylene process was used.

Example 1

20 m³ of soot water are fed with a volume flow rate of 1 m³/h to a pilot-plant thickener with a diameter of 1.3 m. To flocculate the soot solid, an anionic flocculant is metered into the feed line and is mixed in with a static mixer. The dosage of the flocculant is 0.7 kg/t of solid. In the thickener, the soot water is sedimented and concentrated to a solid concentration of 25 g/l (2.5% by weight). The soot sludge (sediment) obtained is subsequently dewatered on a chamber filter press having 10 chambers with dimensions of 400×400×30 mm. The material of the filter cloth consists of polypropylene having an air permeability of 20 l/dm²/min. The charging pump used is a speed-controlled eccentric screw pump. To improve the dewatering properties, downstream of the charging pump, flocculant is added to the pipeline and mixed in by means of a self-regulating mixer (EP 0710625 B1). The dosage of flocculant here is 1.8 kg/t of solid. The starting volume flow rate to the chamber filter press is 250 l/h. After 1 hour, a filtration pressure of 16 bar is achieved, which is kept constant by means of corresponding closed-loop control of the charging pump for another approx. 1 hour. After a total filtration time of approx. 2 hours, the filtration has ended and the filtercake is removed from the chamber filter press. The resulting compact filtercake has a solids content of 24% and is removed very easily from the filter cloth. The lower calorific value of the filtercake was 4560 kJ/kg, such that it can be incinerated efficiently.

Example 2

In the example which follows, soot-contaminated wastewater with ultrafinely divided solid from an acetylene process was used. After the sample had been left to stand for a short time, all of the soot floated and formed a soot layer of from 1 to 2 cm in height on the liquid surface. The water phase was very substantially clear. An amount of 40 mg of anionic surfactant in commercial form was mixed into a soot water sample of 1 l. The mixing-in was effected over 2 minutes by means of a magnetic stirrer. The surfactant exhibited marked wetting and dispersing action, such that the soot had been suspended completely after the treatment. The foam formed was not stable. The initial foam height of approx. 15 mm was reduced to less than 1 mm after 30 seconds. After approx. 2 minutes, the foam had decomposed almost completely and a purification by the process according to the invention was possible.

The invention claimed is:

1. A process for cleaning a wastewater stream consisting of water and soot and is obtained in the preparation of acetylene by partial oxidation of natural gas with oxygen, the soot being present in finely divided form floating on the wastewater, the process comprising removing the soot by:
   (A) adding a surfactant to the wastewater stream to suspend the soot floating on the wastewater to obtain a soot wastewater suspension;
   (B) feeding a first aqueous solution comprising a first flocculant to the soot wastewater suspension to form a resulting soot wastewater suspension;
   (C) solid concentrating the resulting soot wastewater suspension by sedimentation to form a soot sludge;
   (D) feeding a second aqueous solution comprising a second flocculant to the soot sludge to form a resulting soot sludge;
   (E) transporting the resulting soot sludge to a dewatering apparatus; and
   (F) dewatering the resulting soot sludge with the dewatering apparatus by pressure filtration,
   wherein:
   the first aqueous solution comprises only one first flocculant as a sole flocculation agent in the first aqueous solution; and
   the second aqueous solution comprises only one second flocculant as a sole flocculation agent in the second aqueous solution.

2. The process according to claim 1, wherein the first aqueous solution comprising an organic flocculent as the first flocculant is fed to the soot wastewater suspension immediately upstream of the sedimentation.

3. The process according to claim 2, wherein the organic flocculant is an anionic flocculant.

4. The process according to claim 1, wherein the surfactant is added to the wastewater upstream of the sedimentation to improve the wettability of floating soot particles.

5. The process according to claim 4, wherein at least one defoamer is added to at least one of the wastewater stream, the soot wastewater suspension, and the resulting soot wastewater suspension.

6. The process according to claim 1, wherein activated carbon is added to at least one of the wastewater stream, the soot wastewater suspension, and the resulting soot wastewater suspension upstream of the sedimentation to adsorb organic substances dissolved in the wastewater.

7. The process according to claim 1, wherein the second aqueous solution comprising an organic flocculant as the second flocculant is mixed into the soot sludge immediately upstream of the pressure filtration.

8. The process according to claim 7, wherein the organic flocculant is an anionic flocculant.

9. The process according to claim 1, wherein a suspended solid is added as a filtering aid to the wastewater stream.

10. The process according to claim 1, wherein the soot sludge obtained in the sedimentation is transported to the dewatering apparatus with a displacer pump.

11. The process according to claim 10, wherein the soot sludge obtained in the sedimentation is fed to the dewatering apparatus with an eccentric screw pump.

12. The process according to claim 1, wherein the soot is in the form of soot particles having a primary particle size of from 20 to 300 nm.

13. The process according to claim 1, wherein the dewatering consists of the pressure filtration.

14. The process according to claim 1, wherein the soot is removed under alkaline conditions and the process further comprises adding sodium hydroxide to the wastewater stream.

15. The process according to claim 1, wherein a hydraulic residence time during the sedimentation is from 1 to 2 hours.

16. The process according to claim 1, wherein the sedimentation occurs with a sedimentation vessel having a cylindrical part and a lower conical part, such that a cone angle of the lower conical part ranges from 70° to 100° to promote soot sludge discharge.

17. The process according to claim 16, wherein a ratio of diameter to height of the sedimentation vessel ranges from 1:1 to 1:3.

18. A process for cleaning a wastewater stream consisting of water and soot, wherein the wastewater stream is obtained in the preparation of acetylene by partial oxidation of natural gas with oxygen, and at least a portion of the soot in the wastewater stream floats on the surface of the wastewater stream and is present in a finely divided form, the process comprising:
(A) suspending, in the wastewater stream, the soot floating on the wastewater stream by contacting the floating particles of soot with a macromolecular compound prepared by the alkoxylation of a predominantly linear fatty alcohol, to obtain a soot wastewater suspension;
(B) feeding a first aqueous solution comprising a first flocculant to the soot wastewater suspension to form a resulting soot wastewater suspension;
(C) concentrating the resulting soot wastewater suspension by sedimentation to form a soot sludge;
(D) feeding a second aqueous solution comprising a second flocculant to the soot sludge to form a resulting soot sludge; and
(E) dewatering the resulting soot sludge by pressure filtration,
wherein:
the first aqueous solution comprises only one first flocculant as sole flocculation agent in the first aqueous solution; and
the second aqueous solution comprises only one second flocculant as sole flocculation agent in the second aqueous solution.

19. The process according to claim 18, comprising mixing the first aqueous solution comprising the one first flocculant with the soot wastewater suspension to form the resulting soot wastewater suspension.

20. The process according to claim 18, further comprising mixing one or more surfactants with the soot wastewater suspension after the floating soot particles are suspended in the wastewater stream and before the resulting soot wastewater suspension is concentrated to form the soot sludge.

21. The process according to claim 20, further comprising adding one or more defoamers to at least one of the wastewater stream, the soot wastewater suspension, and the resulting soot wastewater suspension.

22. The process according to claim 18, further comprising contacting at least one of the wastewater stream, the soot wastewater suspension, and the resulting soot wastewater suspension with an activated carbon to adsorb one or more dissolved organic substances prior to the concentrating the resulting soot wastewater suspension.

23. The process according to claim 18, further comprising mixing the second aqueous solution comprising the one second flocculant with the soot sludge before the dewatering.

24. The process according to claim 18, further comprising mixing a suspended solid with the wastewater stream.

25. The process according to claim 18, wherein the soot sludge obtained by the concentrating is fed to a dewatering apparatus with a displacer pump.

26. The process according to claim 25, wherein the soot sludge obtained by the concentrating is fed to the dewatering apparatus with an eccentric screw pump.

27. The process according to claim 18, wherein the dewatering consists of the pressure filtration.

28. The process according to claim 18, wherein the soot is removed under alkaline conditions and the process further comprises adding sodium hydroxide to the wastewater stream.

29. The process according to claim 18, wherein a hydraulic residence time during the sedimentation is from 1 to 2 hours.

30. A process for cleaning a wastewater stream consisting of water and soot, wherein the wastewater stream is obtained in the preparation of acetylene by partial oxidation of natural gas with oxygen, and at least a portion of the soot in the wastewater stream floats on the surface of the wastewater stream and is present in a finely divided form, comprising:
(A) partially oxidizing one or more hydrocarbons contained in the natural gas to form acetylene and the wastewater stream;
(B) suspending, in the wastewater stream, the soot floating on the wastewater stream by contacting the floating particles of soot with a macromolecular compound prepared by the alkoxylation of a predominantly linear fatty alcohol, to obtain a soot wastewater suspension;
(C) feeding a first aqueous solution comprising a first flocculant to the soot wastewater suspension to form a resulting soot wastewater suspension;
(D) concentrating the resulting soot wastewater suspension by sedimentation to form a soot sludge;
(E) feeding a second aqueous solution comprising a second flocculant to the soot sludge to form a resulting soot sludge; and
(F) dewatering the resulting soot sludge by pressure filtration,
wherein:
the first aqueous solution comprises only one first flocculant as sole flocculation agent in the first aqueous solution; and
the second aqueous solution comprises only one second flocculant as sole flocculation agent in the second aqueous solution.

* * * * *